United States Patent [19]
Owens

[11] 3,990,241
[45] Nov. 9, 1976

[54] VALVE LOCKING MEANS FOR A TWO STAGE SERVOMOTOR

[75] Inventor: Carl D. Owens, South Bend, Ind.

[73] Assignee: The Bendix Corporation, South Bend, Ind.

[22] Filed: May 19, 1975

[21] Appl. No.: 578,596

[52] U.S. Cl. ............................ 60/553; 60/572; 60/592; 60/584; 91/434
[51] Int. Cl.² ........................................ F15B 7/00
[58] Field of Search .......... 60/547, 556, 553, 554, 60/572, 592, 584; 91/369 A, 391 R, 434

[56] References Cited
UNITED STATES PATENTS

| | | | |
|---|---|---|---|
| 3,048,018 | 8/1972 | Nicolin | 60/677 |
| 3,910,046 | 10/1975 | Gardner | 60/553 |
| 3,911,681 | 10/1975 | Sisco | 60/553 |
| 3,914,941 | 10/1975 | Gardner | 60/553 |
| 3,937,021 | 2/1976 | Sisco | 60/553 |

Primary Examiner—Martin P. Schwadron
Assistant Examiner—Abraham Hershkovitz
Attorney, Agent, or Firm—Leo H. McCormick, Jr.; William N. Antonis

[57] ABSTRACT

A pressure differentially controlled valve for use in a two stage servomotor to prevent reversion from the second stage to the first stage. A first valve initially moves to transfer the output of a servomotor from a first piston to a second piston. A pressure differential responsive second valve prevents the output of the second piston chamber from being communicated to the first piston chamber by moving thereafter with the first valve until an input force is terminated.

8 Claims, 1 Drawing Figure

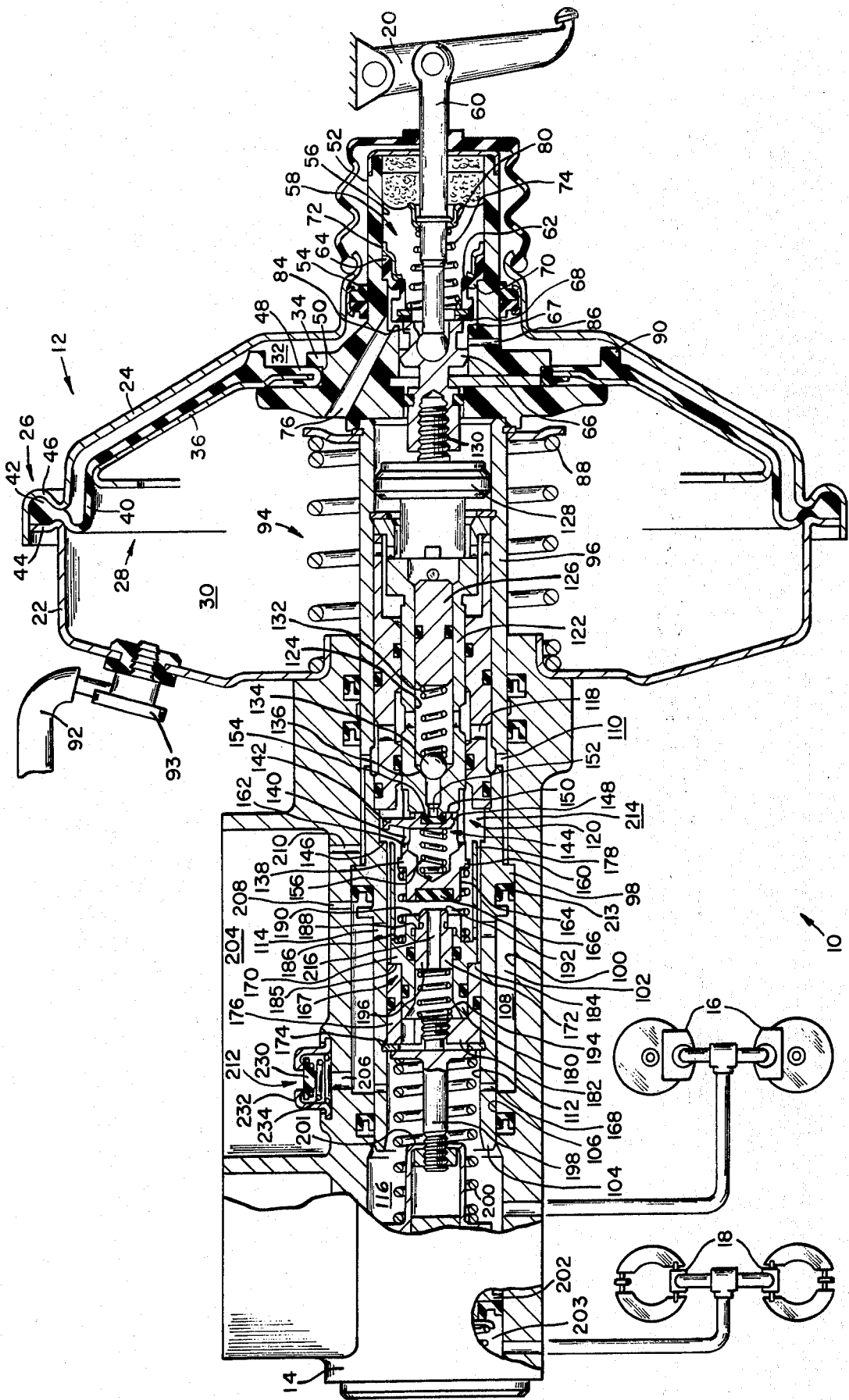

VALVE LOCKING MEANS FOR A TWO STAGE SERVOMOTOR

BACKGROUND OF THE INVENTION

In copending U.S. application Ser. No. 481,433 filed June 20, 1974 and now U.S. Pat. No. 3,911,681 incorporated herein by reference, it is disclosed how a stepped diameter piston can sequentially produce a first pressure force and a second pressure force when a transfer control valve is operated by movement of a plunger connected to an input push rod. An output force is created by the development of a pressure differential across a wall. The stepped diameter piston is connected to the wall. When the transfer control valve is activated, the output force is shifted from the first diameter to the second diameter to produce an added output potential. However, in the event that the pressure differential across the wall does not develop, the transfer control valve directly shifts the input force from the first diameter to the second diameter completely eliminating the development of the first pressure force.

In copending U.S. application Ser. No. 484,381 filed July 1, 1974 and now U.S. Pat. No. 3,937,021, incorporated herein by reference, a hold-off means is disclosed for delaying the development of the second pressure force until the first pressure force reaches a predetermined value before the transfer control valve is activated by the input force. In this servomotor means, a stepped piston means divides the pressurizing chamber of the pressurizing mechanism into a first section and a second section. The first section is connected to a relief chamber through the transfer control valve. The relief chamber is connected to a reservoir through a flow path. A tilt valve means located in the flow path allows communication of fluid from the reservoir, when a stem thereon engages the stepped piston, and prevents communication of fluid from the relief chamber when the stepped piston disengages the stem. As the stepped piston moves in response to the input force, the first piston transfers fluid from the first section through the transfer control valve into the relief chamber. The hold-off means prevents any fluid from escaping from the relief chamber until the first pressure force reaches a predetermined value. This same first pressure force is simultaneously supplied to the wheel brakes. When the first pressure force reaches the predetermined value, the hold-off means releases fluid to the reservoir and permits the input force to act through that portion to provide an added output as a second pressure force for operating the wheel brakes. However, if the transfer valve is rapidly modulated, fluid from the second section will be transferred to the first section when the valve is released and afterwards released into the reservoir. This reduction in fluid from the brake system will allow the stepped piston means to contact the bottom of the bore in the second section before the optimum second pressure force is developed.

Later in copending U.S. application Ser. No. 511,413 filed Oct. 2, 1974 and now U.S. Pat. No. 3,910,046, incorporated herein by reference, a control means is disclosed for adding compensatory fluid to the braking system to replace the fluid transferred to the relief valve during the transfer of the input force from the first diameter to the second diameter of the power piston. However, in such a device if the shift of the operational mode from the first diameter to the second diameter in responsive to the input force is transmitted in an oscillating manner a corresponding change in the displacement volume of the power braking unit will occur which may result in an inadequate quantity of hydraulic fluid to operate the power braking system.

SUMMARY OF THE INVENTION

I have devised a pressure differential controlled valve means actuated by the movement of a transfer valve means moving in response to an input force for sustaining the output of a second piston area in the servomotor after an initial output is produced by a first piston area until the operational input has essentially been terminated. A first valve means shifts the operational output production of the servomotor from the first piston area to the second piston area by sequentially engaging a second valve means to interrupt communication between a large diameter chamber associated with the first piston area and a smaller diameter chamber associated with the second piston area while permitting the release of fluid from the large diameter to a relief reservoir to allow the second piston area to move in the smaller diameter and produce an output therefrom. A first pressure differential is created across the second valve means as the pressure in the smaller diameter chamber increases and that in the larger diameter chamber decreases. This pressure differential will overcome a spring and allow the second valve means to move toward the first valve means. With a decrease in the input force, this first pressure differential will cause the second valve means to follow the movement of the first valve means toward the release position to sustain the operational output on the second piston until a spring overcomes the pressure differential and re-establishes communication between the first diameter and the second diameter which in essence is the released position for the input mechanism.

It is therefore the object of this invention to provide a control means for use in a two stage servomotor whose output is produced by sequentially moving a first piston area in a first diameter bore in response to an initial input force and a second piston area in a second diameter bore in response to an increased input force to sustain the operation of the second piston area in the second diameter bore with a decrease in the input force to the initial operational level.

It is another object of this invention to provide means for moving a first valve and a second valve as a unit after an initial input force has moved the first valve into engagement with the second valve to sustain an operational output potential associated with the second valve upon a reduction in the input force.

It is a further object of the invention to provide a control means for preventing the transfer of an input force from reverting from a small piston to a larger piston with a reduction in the input force until a predetermined input force level is reached.

It is a still further object of this invention for providing a means whereby a second valve means is fixed to a first valve means after the first valve is operated by an input force and thereby prevent the transfer of power from a second piston to a first piston in a servomotor until the termination of the input force.

These and other objects will become apparent from reading this specification and viewing the drawings.

BRIEF DESCRIPTION OF THE DRAWING

The drawing is a schematic illustration of a power braking system with a sectional view of a two stage servomotor having a control means for connecting a first and second valve together after the first valve has been moved by an input force and maintaining the connection until the input force has terminated.

DETAILED DESCRIPTION OF THE PREFERRED EMBODIMENT

The braking system 10, shown in the drawing has a fluid pressure servomotor 12 connected to a master cylinder 14 for supplying the front wheel brakes 16 and rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub 34 with a backing plate 36 extending therefrom. A diaphragm 40 has a first bead 42 on its periphery which is held between flange 44 and flange 46 on the first shell 22 and the second shell 24, respectively, and a second bead 48 which is snapped into groove 50 adjacent the backing plate 36.

The hub 34 has a rearwardly extending projection 52 which extends through opening 54 in the first shell 22. The projection 52 has an axial bore 56 into which a control valve means 58 is located and supplied with an operational input from pedal 20 through push rod 60.

The control valve means 58 has a poppet assembly 62 which is sequentially operated upon movement of plunger 66 by the push rod 60 to interrupt vacuum and allow air to develop a pressure differential across the wall means 28.

The poppet assembly 62 has a face 68 separated from a fixed bead 64 by a flexible section 70. The bead 64 is retained within bore 56 by a retainer 72 which biases the bead 64 against the projection 52. A first spring 74 connected to shoulder 80 on push rod 60 urges the face 86 toward a vacuum seat 67 adjacent vacuum passage 76. The vacuum passage 76 connects the first chamber 30 with the interior bore 56 of the hub means 34.

A return spring 88 located between the shell 22 and hub means 34 urges bumper 90 on diaphragm 40 toward shell 24. In this position, vacuum communicated from the intake manifold through conduit 92 past check valve 93 into the front chamber 30 will evacuate air from the second variable volume chamber 32 by flowing through passage 86 in bore 56 and out passage 76 to vacuum suspend the wall means 28.

A ratio changer means 94 has a cylindrical stepped piston means 96 which is attached to the hub means 34. The stepped piston 96 has a first diameter 98 located in a first diameter section 100 of bore 102 and a second diameter 104 located in a second diameter section 106 of the bore 102 of the master cylinder 14. The first diameter 98 of the piston means 96 divides the first diameter section 100 into a pressurizing chamber 108 and a relief chamber 110. An axial passage 112 which extends through the stepped piston means 96 has a first radial passage 114 which connects the pressurizing chamber 108 with an outlet chamber 116 and a second radial passage 118 which connects the pressurizing chamber 108 with the relief chamber 110.

A transfer valve means 120 is located within the axial passage between the first radial passage 114 and the second radial passage 118 for controlling the communication between the first pressurizing chamber 108 and the relief chamber 110. The transfer valve means 120 has a cylindrical section 122 with an axial bore 124 therethrough into which a plug 126 is located to prevent communication therefrom into the axial passage 112. The plug 126 has a guide 128 which aligns the transfer valve means 120 within the axial passage 112. The plug 126 has adjustable threads 130 for locating the transfer valve means 120 within axial passage 112. A spring 132 located in the bore 124 urges poppet means 134 toward a seat 136 to establish a minimum hudraulic pressure level which will limit communication between the first pressurizing chamber 108 and the relief chamber 110.

A tubular projection 138 which extends from the cylindrical body 122 has a slot 140 cut therethrough for permitting arm 142 of tilt valve means 144 to extend into the axial passage 112 and engage shoulder 146 on the stepped piston means 96 upon movement of the transfer valve means 120. A shoulder 160 on the tubular projection 138 separates a first diameter 162 from a second diameter 164. A resilient disc 166 is located on the end of the second diameter 164.

The tilt valve means 144 has a circular body 148 with an annular seat 150 for covering the opening 152 which connects the first pressurizing chamber 108 with the relief chamber 110. A resilient pad 154 which is located within the annular seat 150 is urged against the cylindrical body 122 by spring 156 to seal the opening 152.

A pressure differential valve means 167 is located within the axial bore 112 between the first radial passage 114 and a relief passage 168 in the piston means 96. The pressure differential valve means 167 includes a first sleeve means 170 and a concentric second sleeve means 172 retained in the axial bore 112 by a stop or snap ring means 174. An annular guide 176 extends from the stop means 174 for aligning the first and second sleeve means 170 and 172 respectively, within the axial bore 112. The first sleeve means 170 has a tapered end 180 which is held against perforated end 182 of the annular guide 176 and a shoulder 184 which is held against the end 185 of guide 176 by spring or resilient means 186. A guide means 178 extends rearwardly from the shoulder 184 to surround the resilient means 186 and provide a connecting link between the second or pressure differential valve means 167 and the tilt valve means 144 upon movement of the transfer valve means 120. The resilient means 186 provides a force sufficient to move the atmospheric seat 84 on the plunger 66 into contact with face 68 of the poppet means or assembly 62 to interrupt the communication of air from the atmosphere to the rear chamber 32 when the push rod 60 is in its rest position.

The second sleeve means 172 has a shoulder 188 which engages shoulder 190 on the first sleeve means 170 to urge seat 192 toward the resilient disc 166 on the cylindrical section 138 in response to spring 194. Spring 194 is caged between end 196 and the perforated end 182 of guide 176.

An adjustable output screw 198 associated with the secondary piston 202 of the master cylinder 14 is held against the snap ring 174 by a spring 200. The screw can move in guide 201 to allow for changes in the line pressure between the front wheel brakes 16 and the rear wheel brake 18. The hydraulic pressure in chamber 116 and the resiliency of spring 200 provide an output force for moving the secondary piston 202 in bore 203 to create the operational output for activating the rear wheel brakes 18. The first pressurizing chamber 108 is connected to the reservoir 204 by a first port 206 and a second port 208 while the relief chamber 110 is connected by a third port 210. A check valve means 212 is associated with the first port 206 to prevent fluid from flowing from the first pressurizing chamber 108 into the reservoir 204. The check valve includes a disc 230 held against a seat 232 by a spring 234.

MODE OF OPERATION OF THE PREFERRED EMBODIMENT

During a braking sequence, when an operator applies an input force to pedal 20, push rod 60 will move to allow spring 74 to move face 68 of the poppet assembly 62 against vacuum seat 67 to interrupt communication between the first chamber 30 and bore 56 through passage 76. Further movement of the push rod 60 will move the atmospheric seat 84 away from face 68 to allow air at atmospheric pressure present in bore 56 to enter the rear chamber 32 through passage 86. With air in the rear chamber 32 and vacuum in the front chamber 30, a pressure differential will be created across the wall means 28. This pressure differential will create an operational force which will be transmitted through the hub means 34 to move the piston means 94 in bore 102 of the master cylinder 14. As the first diameter section 98 of the piston means 94 moves in the first diameter section 100 a first hydraulic pressure will develop in the pressurizing chamber 108 after the lip seal 213 has moved past the second port 208. This first hydraulic pressure will be communicated through passage 114 into control chamber 214, out axial bore 216 of the second sleeve 172 and into the outlet chamber 116 for communication to the wheel brakes 16. At the same time spring 200 and the fluid pressure in chamber 116 will move piston 202 to develop a corresponding hydraulic pressure in chamber 218 for operating the rear wheel brakes 18.

The first hydraulic pressure in the control chamber 214 will act on the cylindrical section 122 to balance the input force transmitted through the adjustable guide 128 of the plunger 66. As the operator increases the input force through the push rod 60, the pressure differential across wall means 28 will correspondingly increase until the rear chamber 32 is completely filled with air at atmospheric pressure, commonly referred to as "vacuum runout". Any further input from the operator will be transmitted from plunger 66 to move the cylindrical section 122. When sufficient movement has occurred to move resilient disc 166 onto seat 192, communication between the first pressurizing chamber 108 and the outlet chamber 116 will be interrupted. Further movement of the cylindrical section 122 will move arm 142 into contact with shoulder 146 causing the tilt valve means 144 to pivot on the annular seat 150 and allow fluid under pressure in the first pressurizing chamber 108 to overcome spring 132 and flow into the relief chamber 110. As the fluid under pressure is released from the first pressurizing chamber 108, the pressure differential acting on wall means 28 will be proportionally applied to move the second diameter 104 in the second section 106 and provide an increased or second stage hydraulic pressure in the outlet chamber 116 for operating the wheel brakes 16 and 18.

As the hydraulic pressure differential between the first pressurizing chamber 108 and the second pressurizing or outlet chamber 116 increases, spring 186 will transmit an indication to the operator of the intensity of the pressurization of the fluid in the outlet chamber 116. However, the hydraulic pressure differential will move the guide means 178 on the first sleeve 170 into contact with arm 142 to essentially establish free communication between the first pressurizing chamber 108 and the relief chamber 110 through the opening 152. Thus, the first hydraulic pressure in the first chamber 108 is rapidly reduced to essentially zero, depending upon the resiliency of spring 132 of the check or poppet valve means 134.

As the hydraulic fluid pressure is released from the first pressurizing chamber 108, the hydraulic fluid pressure in the second or outlet pressurizing chamber 116 acting on the second diameter 104 will be transmitted through the plunger 66 to move the face 68 of poppet means 58 away from the vacuum seat 84 to adjust the pressure differential across the wall means in a direct relationship of the ratio of the area of the first diameter section 98 to the second diameter section 104. Now any increase in the oprational input will be achieved through the balancing of the poppet valve means 58.

With a reduction in the input force on pedal 20, arm 142 of the tilt valve means 144 will move away from the shoulder 146; however, the end of guide means 178 will still hold seat 150 away from opening 152 and permit free communication between the first pressurizing chamber 108 and the relief chamber 110. The pressure differential acting on the first sleeve means 170 will hold the shoulder end thereof against the end of the second diameter 164 of the tubular projection 138 to allow spring 194 to hold tapered face 181 against the resilient face 166 and seal the communication between the second pressurizing chamber 116 and the first pressurizing chamber 108 through the axial bore 216. As long as the hydraulic pressure differential across the first sleeve means 170 is sufficient to overcome spring 186 and spring 156, the second or pressure differential valve means 167 and the first or transfer valve means 120 will move as a unit to sustain the output of the wall means on the second diameter 104 of the piston means 96 in the second area 106. Thus, during periods of balancing the output of the servomotor with the input applied through the pedal, it is virtually impossible to alternately transfer the production of hydraulic pressure between the first chamber 110 and the second chamber 116. Once the input force has sequentially actuated the first valve means 120 and the second valve means 167 they are locked together as a unit until springs 186 and 156 move the first sleeve means 170 away from the end of the tubular projection 138. Spring 194 will still hold the tapered face 180 against the resilient disc 166 until seat 150 is urged against the housing surrounding passage 152 to interrput the communication between the first pressurizing chamber 108 and the relief chamber 110. As the first diameter section 100 moves in bore 102, a first release pressure differential will be created between the first pressurizing chamber 108 and the reservoir 204 and a second release pressure differential will be created between the first and second pressurizing chambers. This first release pressure differential will overcome spring 234 to allow fluid from the reservoir to enter the first pressurizing chamber 108 and replace that fluid which was transmitted through the relief chamber 110 during the pressure intensification mode of operation by the second diameter 104 of the piston means 96. The second pressure differential is proportionally reduced with a reduction in the input force on the pedal 20. When the second pressure differential reaches a predetermined value which is essentially when the input force is terminated, spring 186 will move the first sleeve 170 on guide 176 to unseat the tapered face 181 from the resilient pad 166 and allow communication between the first 110 and second 116 pressurizing chambers.

Upon termination of the intput force on pedal 20, return spring 186 will move the atmospheric seat 84 against face 68 and face 68 away from the vacuum seat 67 to allow the vacuum present in chamber 30 to evacuate the rear chamber and again vacuum suspend the wall means 28. In this position, fluid in the second pressurizing chamber 116 can bypass the valve means 167 by flowing through radial opening 168 into the first pressurizing chamber 108. At the same time, reservoir 204 will be connected through port 208 to the first pressurizing chamber 108 for replenishing any fluid which may have been lost from the braking system during the previous braking sequence.

I claim:

1. In a power braking system having a piston means which is moved by a wall means responding to an operational input force, said piston means sequentially producing a first fluid force in a first mode of operation and a second fluid force in a second mode of operation, control means for preventing said piston means from reverting from the second mode of operation to the first mode of operation, said control means comprising:

a housing having a bore therein with a first diameter and a second diameter, said piston means dividing the first diameter into a first pressurizing chamber and a relief chamber, said piston means extending into said second diameter of said bore to form a second pressurizing chamber therein, said housing having port means connecting a source of fluid with said first diameter of said bore, said piston means having a first axial bore therethrough with a first radial opening connected to the first pressurizing chamber and a second radial opening connected to the relief chamber;

first valve means located in the first axial bore of said piston means between the first radial opening and the second radial opening for preventing communication between the first pressurizing chamber and the relief chamber while allowing communication between the first pressurizing chamber and the second pressurizing chamber when the wall means moves the piston means in said first diameter in said first mode of operation and for interrupting the communication between the first pressurizing chamber and the second pressurizing chamber while allowing communication between the first pressurizing chamber and the relief chamber in said second mode of operation when the wall means moves the piston means in said second diameter; and second valve means located in said first axial bore of the piston means between the first radial opening and an outlet of the second pressurizing chamber for allowing said first fluid force to be freely communicable between the first pressurizing chamber and the second pressurizing chamber in said first mode of operation and for preventing communication therebetween in said second mode of operation in response to a pressure differential developed between a second fluid force and the fluid in the first pressurizing chamber after said communication of the first pressurizing chamber with the relief chamber, said second valve means including guide means extending towards said first valve means said pressure differenitial moving said second valve means with said guide means, said guide means engaging said first valve means to allow communication between the first pressurizing chamber and the relief chamber in said second mode of operation until said operational input is reduced to a predetermined level.

2. In the power braking system, as recited in claim 1, wherein said first valve means includes:

tilt valve means responsive to said operational input force for establishing communication between said first pressurizing chamber and said relief chamber to create said pressure differential.

3. In the power braking system, as recited in claim 2 wherein said first valve means further includes:

a cylindrical body having a second axial bore therein; poppet means located in said second axial bore; and first resilient means for urging said poppet means toward a seat to maintain a predetermined volume of fluid in said first pressurizing chamber in the second mode of operation.

4. In the power braking system, as recited in claim 3, wherein said first valve means further includes:

projection means extending from said cylindrical means toward said second valve means, said projection means having a resilient surface on the end thereof for engaging said second valve means in said second mode of operation.

5. In the power braking system, as recited in claim 4, wherein said tilt valve means includes:

an annular face;
an arm attached to said annular face and extending through a slot in the cylindrical body; and
first resilient means connected to said projection means for urging said annular face against a seat to prevent communication through said second axial bore during said first mode of operation.

6. In the power braking system, as recited in claim 5, wherein said second valve means includes:

first sleeve means located in said first axial bore having an internal annular stop and an external shoulder for engaging a retainer means in the piston means; and
second sleeve means concentric to and slidable in said first sleeve means having a rib on the external surface thereof.

7. In the power braking system, as recited in claim 6, wherein said second valve means further includes:

first spring means located in said first axial bore between the first sleeve means and the projection means for holding said external shoulder on the first sleeve means against said retainer means during said first mode of operation; and
second spring means located in said first axial bore between the second sleeve means and said retainer means for holding said rib on second sleeve means against the internal annular stop on the first sleeve means during said first mode of operation.

8. In the power braking system, as recited in claim 7, wherein said
guide means extends from said external shoulder for surrounding said first spring means, said pressure differential developed in said second mode of operation moving said first sleeve means away from said retainer in opposition to said first spring means, said guide means upon movement of said first sleeve means engaging said arm on the tilt valve means to hold said annular face away from the seat of the passageway to the second axial bore during said second mode of operation.

* * * * *